United States Patent
Wang (10) Patent No.: US 10,033,527 B2
(45) Date of Patent: Jul. 24, 2018

(54) DUAL-MODE PROCESSING OF CRYPTOGRAPHIC OPERATIONS

(71) Applicant: Fortinet, Inc., Sunnyvale, CA (US)

(72) Inventor: Wei Wang, North Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 215 days.

(21) Appl. No.: 15/199,078

(22) Filed: Jun. 30, 2016

(65) Prior Publication Data

US 2018/0006806 A1  Jan. 4, 2018

(51) Int. Cl.
*H04L 9/00* (2006.01)
*H04L 9/06* (2006.01)

(52) U.S. Cl.
CPC .................. *H04L 9/0631* (2013.01)

(58) Field of Classification Search
CPC ..................................... H04L 9/0631
USPC ........................................ 713/189
See application file for complete search history.

(56) References Cited

U.S. PATENT DOCUMENTS

2010/0293353 A1* 11/2010 Sonnier ................. G06F 15/167
                                                    711/170

* cited by examiner

*Primary Examiner* — Longbit Chai
(74) *Attorney, Agent, or Firm* — Hamilton, DeSantics & Cha LLP (57) ABSTRACT

Systems and methods for dual mode hardware acceleration for cryptographic operations are provided. According to one embodiment, data upon which a cryptographic operation is to be performed is receive by a computer system that includes a host CPU and a cryptographic hardware accelerator. The data is divided into multiple blocks. Performance of the operation on a first block is offloaded to the hardware accelerator. For each remaining block: (i) the CPU requests state information of the hardware accelerator; (ii) when the state satisfies a condition, then performance of the operation is offloaded to the hardware accelerator; (iii) otherwise, the operation is performed by the CPU by invoking a native hardware supported cryptographic instruction. In this manner, the cryptographic operation is performed on at least one of the blocks by the hardware accelerator and the operation is performed on at least another of the blocks by the CPU.

10 Claims, 8 Drawing Sheets

DUAL-MODE PROCESSING OF CRYPTOGRAPHIC OPERATIONS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2016, Fortinet, Inc.

BACKGROUND

Field

Embodiments of the present invention generally relate to computer security. More particularly, embodiments of the present invention relate to efficient execution of cryptographic operations by selectively using both hardware acceleration modules (cryptographic accelerators) and software running on the host central processing unit (CPU).

Description of the Related Art

There are many computing tasks that are heavy when run concurrently, and require sharing of resources in order to be completed in an efficient way. Also, on many occasions, such tasks are of a different nature, e.g., cryptographic related tasks, authentication related tasks, network processing related tasks, and graphic rendering related tasks, among others. However, resource sharing for optimal use of computing resources is mandatory in order to execute the tasks efficiently. Tasks, e.g., cryptographic operations are generally lengthy and complex, and if they are run alone on a CPU, the use of CPU resources will not be optimal.

Cryptographic operations are essential for data security purposes to protect data, files, documents, and the like while they are stored on a hard drive or removable media or in transit through one or more public networks. There are various algorithms, including, but not limited to, Rivest-Shamir-Adleman (RSA), Advanced Encryption Standard (AES), Message Digest 5 (MD5), Secure Hash Algorithm (SHA) Diffie-Hellman (DH), RC5, Blowfish and International Data Encryption Algorithm (IDEA) according to which cryptographic operations may be performed.

Traditionally, cryptographic operations have been performed completely in software or are completely offloaded to one or more hardware acceleration modules. A typical general purpose CPU is not adequate to perform both its own tasks as well as cryptographic tasks concurrently. To improve the performance, hardware accelerators are commonly used to offload cryptographic operations from the CPU. Existing solutions enable offloading of tasks from a host CPU to one or more hardware acceleration modules via a system bus; however, such offloading incurs delays due to memory transfers and other communication overhead. Furthermore, dedicated hardware accelerators for cryptographic computation are high latency devices. In order to fully utilize the computational resources, all of the hardware acceleration modules in these devices must be fully occupied. Additionally, such offloading requires the CPU to regularly poll the hardware acceleration modules to both determine the availability of resources to perform additional cryptographic operations and determine the availability of results. As those of ordinary skill in the art will appreciate, when all hardware acceleration modules are busy, CPU cycles are simply being wasted as a result of this polling.

SUMMARY

Systems and methods are described for dual mode hardware acceleration for cryptographic operations. According to one embodiment, data upon which a cryptographic operation is to be performed is receive by a computer system that includes a host central processing unit (CPU) and a cryptographic hardware accelerator coupled to the host CPU. The data is divided by the CPU into multiple blocks. Performance of the cryptographic operation on a first block of the multiple blocks is offloaded to the cryptographic hardware accelerator. For each remaining block: (i) the CPU requests state information associated with the cryptographic hardware accelerator; (ii) when the state information satisfies a predetermined condition, then performance of the cryptographic operation on the remaining block is offloaded to the cryptographic hardware accelerator; (iii) when the state information does not satisfy the predetermined condition, then the cryptographic operation is performed by the CPU on the remaining block by invoking a native hardware supported cryptographic instruction on the remaining block. In this manner, the cryptographic operation is performed on at least one of the blocks by the cryptographic hardware accelerator and the cryptographic operation is performed on at least another of the blocks by the CPU.

Other features of embodiments of the present invention will be apparent from the accompanying drawings and from the detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for dual mode hardware acceleration for cryptographic operations. In accordance with embodiments of the present invention, the host CPU selectively uses both available hardware acceleration modules and native hardware supported cryptographic instructions (e.g., Intel Corporation's AES New Instructions (AES-NI)), if available, to enable more efficient utilization of computational resources. For example, in one embodiment, if the host CPU has native hardware supported cryptographic instructions, instead of continuing to poll the dedicated hardware acceleration modules for available resources when they are busy, the CPU can selectively perform the cryptographic operations directly, thereby greatly reducing the CPU cycles wasted on polling and increasing the number of cryptographic operations that can be performed within a period of time.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, e.g. ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, e.g. software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named Systems and methods are provided for dual mode hardware acceleration for cryptographic operations. According to one embodiment, a computer system can include a host central processing unit (CPU) and a cryptographic hardware accelerator coupled to the host CPU. When the system receives data upon which a cryptographic operation (e.g., a block cryptographic operation) is to be performed, the CPU divides the data into multiple of blocks, offloads performance of the cryptographic operation on a first block of the multiple blocks to the cryptographic hardware accelerator. Then, for each remaining block of the multiple blocks, the CPU requests state information associated with the cryptographic hardware accelerator; and when the state information satisfies a predetermined condition, the CPU offloads performance of the cryptographic operation on the remaining block to the cryptographic hardware accelerator; otherwise, the CPU performs the cryptographic operation on the remaining block by invoking a native hardware supported cryptographic instruction on the remaining block. Thus, the cryptographic operation is performed on at least one of the multiple blocks by the cryptographic hardware accelerator, and the cryptographic operation is performed on at least another of the multiple of blocks by the CPU.

In an aspect, the state information can be indicative of whether the cryptographic hardware accelerator is available to perform the cryptographic operation, wherein the predetermined condition comprises availability of the cryptographic hardware accelerator to perform the cryptographic operation. In another aspect, the predefined condition can be based on any or a combination of an extent to which a queue of the cryptographic hardware accelerator is occupied, an expected amount of time for the cryptographic operation to be completed by the cryptographic hardware accelerator, and a current utilization of one or more resources of the cryptographic hardware accelerator.

In another aspect, each of the multiple of blocks have a block size of 32, 64, 128, 256 or 512 bits of data and the block cryptographic operation is one of Rivest-Shamir-Adleman (RSA), Advanced Encryption Standard (AES), Message Digest 5 (MD5), Secure Hash Algorithm (SHA) Diffie-Hellman (DH), RC5, Blowfish and International Data Encryption Algorithm (IDEA). Those skilled in the art will appreciate other current or future block cryptographic algorithms may be used.

In another aspect, the state information is obtained by a scheduler running on the host CPU.

Figure 1:
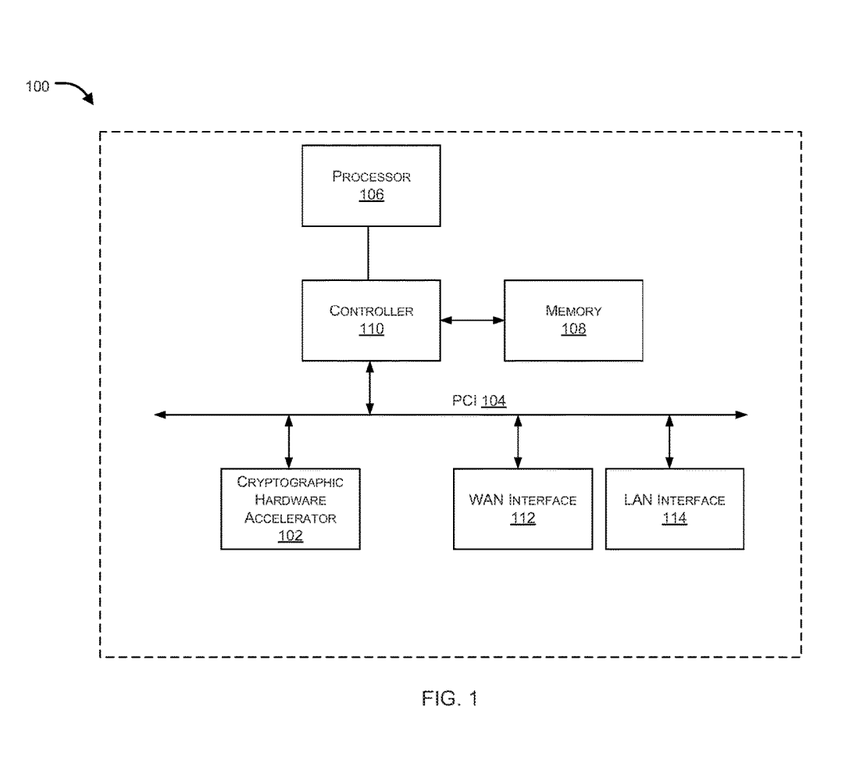
FIG. 1 illustrates a high-level exemplary architecture showing interaction between a hardware accelerator and a host CPU in accordance with an embodiment of the present invention.

FIG. 1 illustrates a high-level exemplary architecture 100 showing interaction between a hardware accelerator 102 and a host CPU 106 in accordance with an embodiment of the present invention. In the context of the present example, computer system 100 may have a host CPU, for example, processor 106, configured to perform different computational operations, one or more cryptographic hardware accelerator(s) 102 configured to perform cryptographic operations, a memory unit 108 configured to store data on which the cryptographic operations are to be performed, a controller 110 configured to receive the data on which cryptographic operation is to be performed and then offload at least a part of the received data to cryptographic hardware accelerator 102 or to processor 106 based on state information of cryptographic hardware accelerator 102.

Those skilled in the art will appreciate although various embodiments of the present invention are described herein with respect to carrying out of a cryptographic operation by a computer system having a special purpose cryptographic hardware accelerator 102 to perform the cryptographic operation, in alternative embodiments, the selective offloading approach described herein can be used for dual-mode operation of a variety of other operations/tasks, for which the system includes a dedicated module or a hardware accelerator, and the CPU of which system is also capable of performing that operation.

In an exemplary implementation, computer system 100 may have a wide area network (WAN) interface 112 or a Local area network (LAN) interface 114 through which the data on which the cryptographic operation needs to be performed can be received. Different hardware components of computer system 100 can share data over a peripheral component interconnect (PCI) bus 104. In an exemplary implementation, controller 110 can be integrated with processor 106, or can be operatively coupled with processor 106 (as shown). Controller 110 can receive the data either from memory 108 or from WAN interface 112 or LAN interface 114, and accordingly assign/offload the data either to processor 106 or cryptographic hardware accelerator 102 based on the state associated with cryptographic hardware accelerator 102.

In an aspect, controller 110 can selectively use both, cryptographic hardware accelerator 102 as well as processor 106 to enable more efficient utilization of computational resources. In an aspect, processor 106 can perform cryptographic operation using native hardware supported cryptographic instructions. For example, in one embodiment, if processor 106 has native hardware supported cryptographic instructions, processor 106, instead of continuing to poll cryptographic hardware accelerator 102 for available resources when it is busy, can selectively perform the cryptographic operation directly on its own, thereby greatly reducing CPU cycles that would otherwise have been wasted on polling, and increasing the number of cryptographic operations that can be performed within a period of time.

In another aspect, controller 110 or processor 106 can receive data on which the cryptographic operation is to be performed from memory 108, divide the data into multiple equally-sized data blocks to facilitate separate and independent processing of such data blocks by a combination of cryptographic hardware accelerator 102 and processor 106. In an exemplary implementation, controller 110, which can be a part of processor 106, can offload a first data block to cryptographic hardware accelerator 102, and assign the next data block to processor 106 if processor 106 has the capability to perform the cryptographic operation. The controller 110 can also poll/request for state information from cryptographic hardware accelerator 102 at regular intervals or on demand, and when the state information satisfies one or more pre-defined conditions the subsequent data block on which the cryptographic operation is to be performed can be offloaded to cryptographic hardware accelerator 102.

In an aspect, the state information can be indicative of whether cryptographic hardware accelerator 102 is available to perform a cryptographic operation. In another aspect, the predetermined condition based on which a determination is made regarding whether the cryptographic operation is to be performed by cryptographic hardware accelerator 102 or by processor 106 can be based on an assessment of availability of the cryptographic hardware accelerator 102 to perform the cryptographic operation. In an aspect, when the state information is indicative of availability of cryptographic hardware accelerator 102 is received, the subsequent data block can be offloaded to the cryptographic hardware accelerator 102 by processor 106 or by controller 110.

In an exemplary implementation, the interval at which processor 106 or controller 110 polls or requests for the state information from cryptographic hardware accelerator 102, can be based on an estimated amount of time required to complete execution of the last offloaded cryptographic operation. The estimated time of execution can be calculated based on the time taken by cryptographic hardware accelerator 102 to perform the cryptographic operation on a data block of a similar/same size and type. In another aspect, the predefined condition can be based on any or a combination of the extent to which one or more queues/input buffers of cryptographic hardware accelerator 102 are occupied, an expected amount of time for the current cryptographic operation(s) to be completed for assigned block(s) by cryptographic hardware accelerator 102, and a current utilization of one or more resources of cryptographic hardware accelerator 102. In an exemplary implementation, each data block can be of 128 bits or 256 bits or 512 bits, and the cryptographic operation to be performed can be an Advance Encryption Standard (AES) encryption operation, a Data Encryption Standard (DES) encryption operation or a triple DES encryption operation. Those skilled in the art will appreciate the aforementioned types of encryption operations are non-limiting and other types of cryptographic operations are well within the scope of the present disclosure.

Although embodiments of the present disclosure have been described with respect to one cryptographic hardware accelerator 102 and one processor 106, in different implementations, computer system 100 may have more than one processor, each such processor may have one or more cores and/or computer system 100 may have more than one cryptographic hardware accelerator, each having one or more acceleration modules. As such, offloading of data blocks to different cryptographic hardware accelerators, hardware acceleration modules, processors and/or processor cores can be performed based on the state information received from each or a defined/desired configuration/combination of cryptographic hardware accelerators. As such various combinations of numbers and types of processors and cryptographic hardware accelerators are well within the scope of the present disclosure. In an exemplary implementation, controller 110 can be configured to poll the state information of each cryptographic hardware accelerator, and offload remaining data blocks to a cryptographic hardware accelerator that is available.

It should further be appreciated that although embodiments of the present disclosure have been explained with respect to dividing data received into one or more blocks, it is also possible that the cryptographic operation is done as a whole on an incoming packet/message, for which the cryptographic operation is performed for the whole packet/message either by cryptographic hardware accelerator 102 or by processor 106 depending on the state of cryptographic hardware accelerator 102.

Figure 2A:
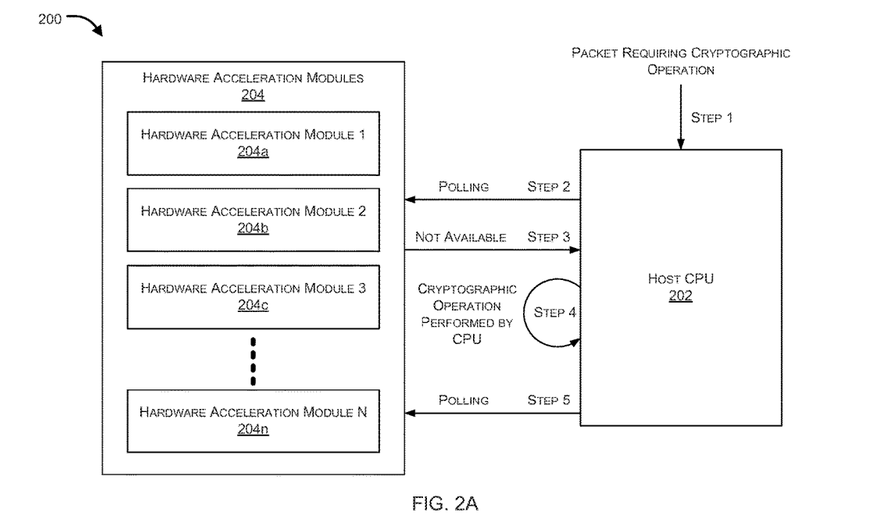
FIGS. 2A to 2C illustrate various architectures for performing dual-mode processing of cryptographic operations in accordance with embodiments of the present invention.
Figure 2B:
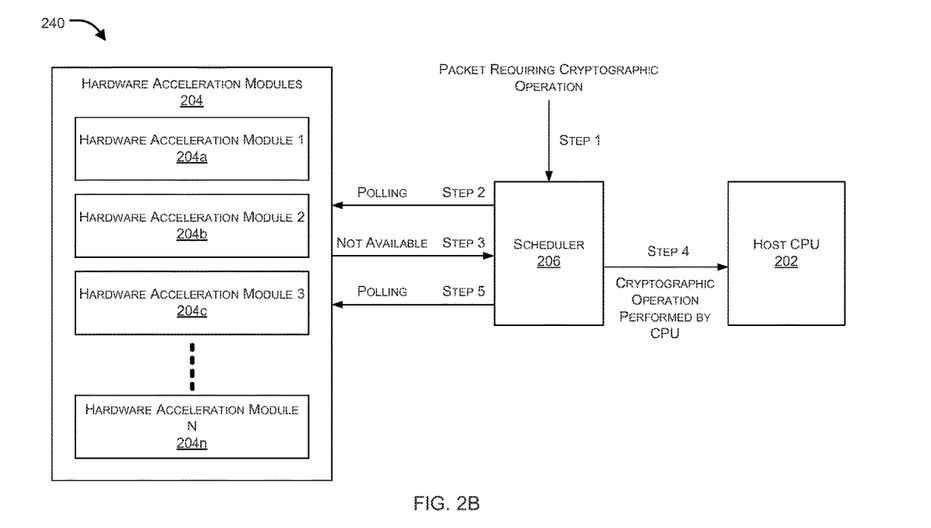
Figure 2C:
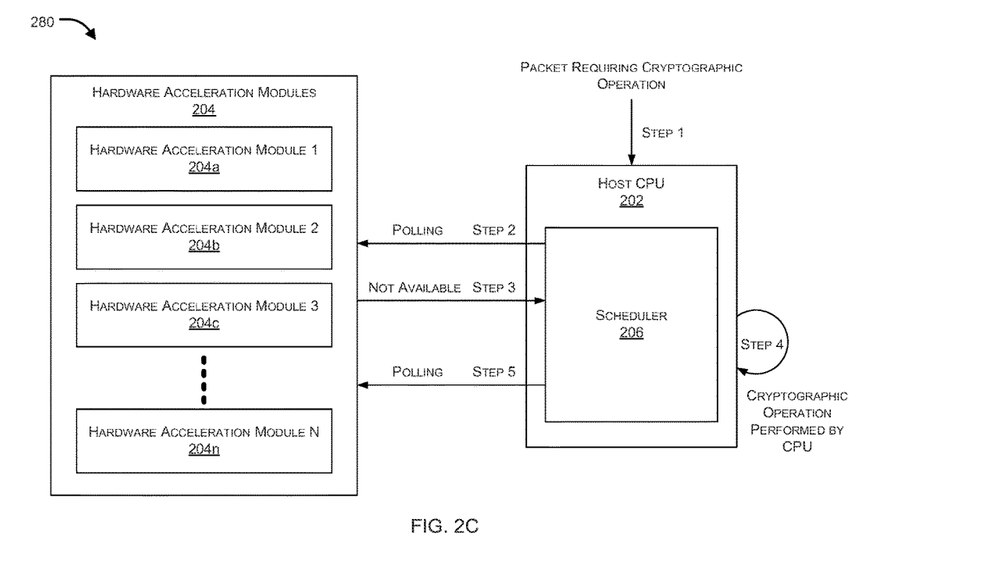

FIGS. 2A to 2C illustrate various alternative architectures 200 and 240 in accordance with embodiments of the present invention. As shown in FIG. 2A, a host CPU 202 can receive data upon which a cryptographic operation is to be performed. The data may be received from a variety of sources, including, but not limited to local storage, a packet of a live media stream or connect feed (step 1). Upon receipt of the data, host CPU 202 can perform a polling operation (step 2) to determine state information of hardware acceleration modules (HAM) 204. In an aspect, there may be multiple hardware acceleration modules, for example HAM 204a-n. If the result of polling or state information indicates non-availability of HAMs 204 (step 3), host CPU 202 can perform the cryptographic operation on at least a part of the data (step 4), and then return back to polling HAMs 204 for their availability/state information upon completion (step 5). On the other hand, when the state information received from HAMs 204 indicates availability, CPU 202 can offload a next of the remaining blocks of the data to HAMs 204 for performing the cryptographic operation. In an exemplary implementation, CPU 202 can offload remaining blocks of the data to HAMs 204 for performing the cryptographic operation when the state information indicates potential availability of HAMs 204 within a predetermined amount of time (e.g., 1 to 100 microseconds depending upon the type of cryptographic operation being performed) or if the resource utilization of HAMs 204 is less than 80% or if an input queue of HAMs 204 has fewer than a defined number of blocks queued thereon. In an exemplary implementation, a buffer can be associated with HAMs 204 or with each HAM 204a-n so that they can queue one or more blocks of the data and the associated cryptographic operation to be performed thereon.

FIG. 2B illustrates an exemplary architecture 240 employing a scheduler 206 for polling state information associated with HAMs 204 and offloading performance of cryptographic operations in accordance with an embodiment of the present invention. As shown in FIG. 2B, scheduler 206 can be configured to receive packet/data requiring cryptographic operation (e.g., encryption/decryption) (step 1), perform polling for state information associated with HAMs 204 (step 2), and offload (step 4) at least one data block of the received packet/data to a host CPU 202 if the state information does not match a predefined condition, e.g., when it is determined that the HAMs 204 are not available (step 3). Scheduler 206 can then again perform the polling operation (step 5) at a predefined interval or on demand to determine updated/current state information associated with HAMs 204, and offload other data blocks to HAMs 204 when the state information matches the predefined condition(s) indicative of, for example, availability of HAMs 204 to perform the cryptographic operation at issue.

FIG. 2C illustrates another exemplary architecture 280 for performing dual-mode processing of cryptographic operations in which a scheduler 206 is configured within a host CPU 202, and therefore, at step 3, when scheduler 206 determines that HAMs 204 are not available, host CPU 202 performs the cryptographic operation at step 4.

Figure 3:
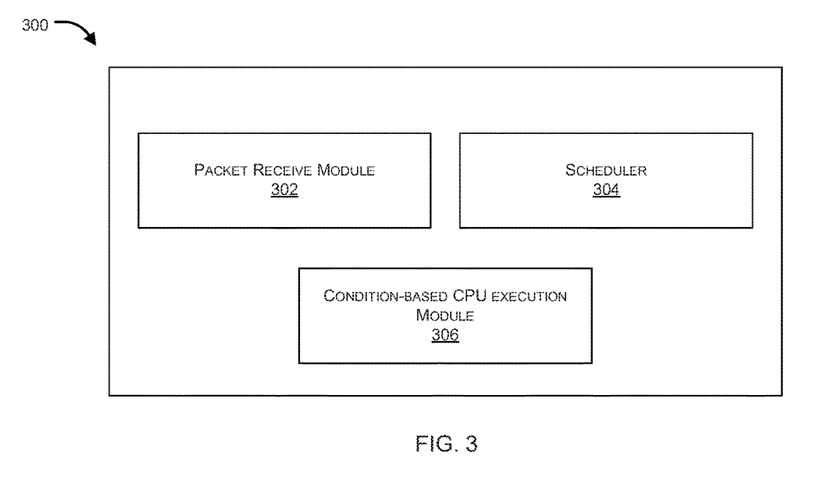
FIG. 3 illustrates exemplary functional modules of a system in accordance with an embodiment of the present invention.

FIG. 3 illustrates exemplary functional modules of a system 300 in accordance with an embodiment of the present invention. In an aspect, system 300 enables dual-mode processing of cryptographic operation and can include a packet receive module 302 configured, within a computer system having at least one host CPU and at least one cryptographic hardware accelerator, to receive packet/message/data upon which a cryptographic operation is to be performed. System 300 can further include a scheduler 304 configured to divide the data into data blocks sized in accordance with the block size of the type of cryptographic algorithm being employed, and offload a first data block to the cryptographic hardware accelerator (CHA) for performance of the cryptographic operation, and a condition-based CPU execution module 306 working in conjunction with scheduler 304 to request state information associated with the CHA, and selectively perform cryptographic operations on the remaining blocks by the CPU or by the CHA depending upon the state information associated with the CHA. For example, when the CHA is available to perform the cryptographic operation, a next data block of the remaining blocks can be offloaded to the CHA; however, rather than waiting for availability of the CHA when the CHA is busy, the CPU can perform the cryptographic operation itself.

In an exemplary implementation, the CPU can be configured to poll state information associated with the CHA at regular intervals or on demand (e.g., when a data block is ready to have a cryptographic operation performed thereon). In an exemplary implementation, module 306 can be configured to perform the cryptographic operation on a data block of the remaining blocks when the state information of the CHA does not satisfy a predetermined condition (e.g., a condition indicative of availability of the CHA to perform the cryptographic operation). In an exemplary implementation, rather than performing 100% of the cryptographic operations by the CPU or offloading 100% of the cryptographic operations to the CHA, the CHA performs the cryptographic operation on at least one of the data blocks, and the CPU performs the cryptographic operation on at least one of the data blocks, thereby efficiently making use of both the CPU and the CHA.

In one embodiment, the offloading decision can be based on the state information associated with the CHA, wherein the state information can be indicative of whether the CHA is available to perform the cryptographic operation. Non-limiting examples of predetermined conditions against which the state information may be evaluated include any or a combination of (i) the extent to which an input queue of the CHA is occupied, (ii) an expected amount of time for a current cryptographic operation being performed by the CHA to be completed; and (ii) a current utilization of one or more resources of the CHA. The one or more resources taken into account by the state information may include, but are not limited to, memory resources and processor resources of the CHA. For example, a predefined condition can be expressed essentially as "offload the remaining/next data block(s) to the CHA if the CHA is less than 70% occupied", or "offload the remaining/next data block to the CHA if the input queue of the CHA is empty", or "offload the remaining/next data block to the CHA if estimated execution time for assigned work is less than 5 microseconds", or other similar conditions.

Figure 4:
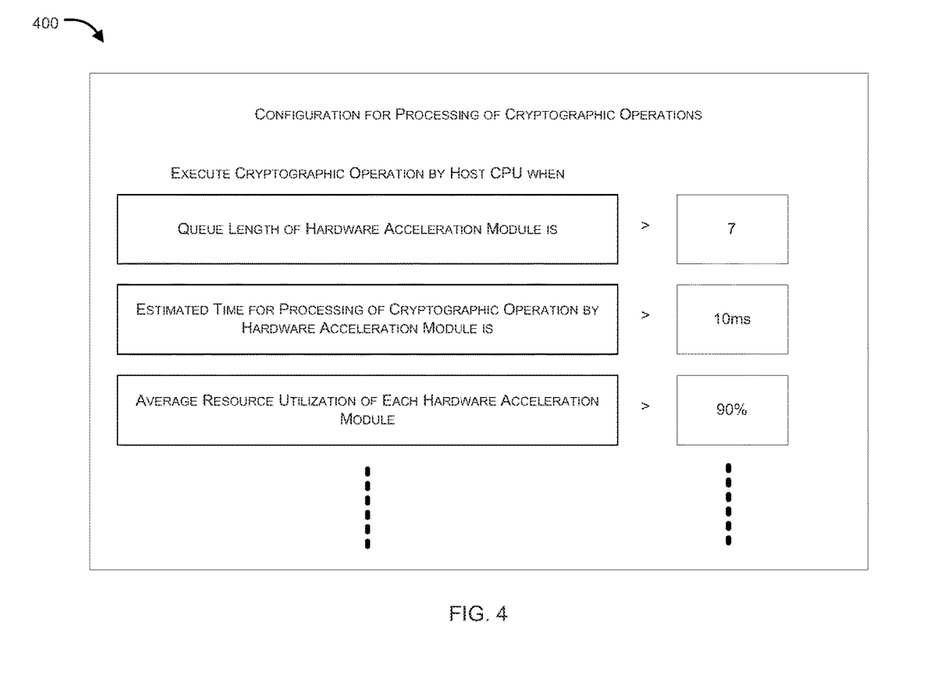
FIG. 4 illustrates a configuration screen of a graphical user interface through which a network administrator may configure conditions defining selective allocation of cryptographic operations between a host CPU and one or more hardware acceleration modules in accordance with an embodiment of the present invention

FIG. 4 illustrates a configuration screen 400 of a graphical user interface through which a network administrator may configure conditions defining selective allocation of cryptographic operations between a host CPU and one or more cryptographic hardware accelerator modules in accordance with an embodiment of the present invention. As shown in FIG. 4, configuration screen 400 can be provided for enabling configuration for processing of cryptographic operations. Screen 400 can include conditions, the satisfaction of which, cause the computer system to assign execution of a cryptographic operation to the host CPU. Such conditions can be, for example, the length of a queue (e.g., an input queue) of the cryptographic hardware accelerator module being more than a predefined threshold (e.g., more than 7 data blocks are queued and awaiting processing), or estimated execution time for processing of outstanding cryptographic operation(s) by the cryptographic hardware accelerator module is more than a predefined time (e.g., 10 ms), or the average resource utilization of each cryptographic hardware accelerator module is more than a predefined threshold (e.g., 90%). There can be several such conditions, which can be used individually or in combination for making the offloading decision, and enabling dual mode of cryptographic operation. In an exemplary implementation, screen 400 can include a variety of conditions, individually or in combination, which when satisfied/not satisfied, cause the computer system to offload performance of a cryptographic operation on the remaining/next data block(s) to the host CPU or to a cryptographic hardware accelerator, respectively.

Figure 5:
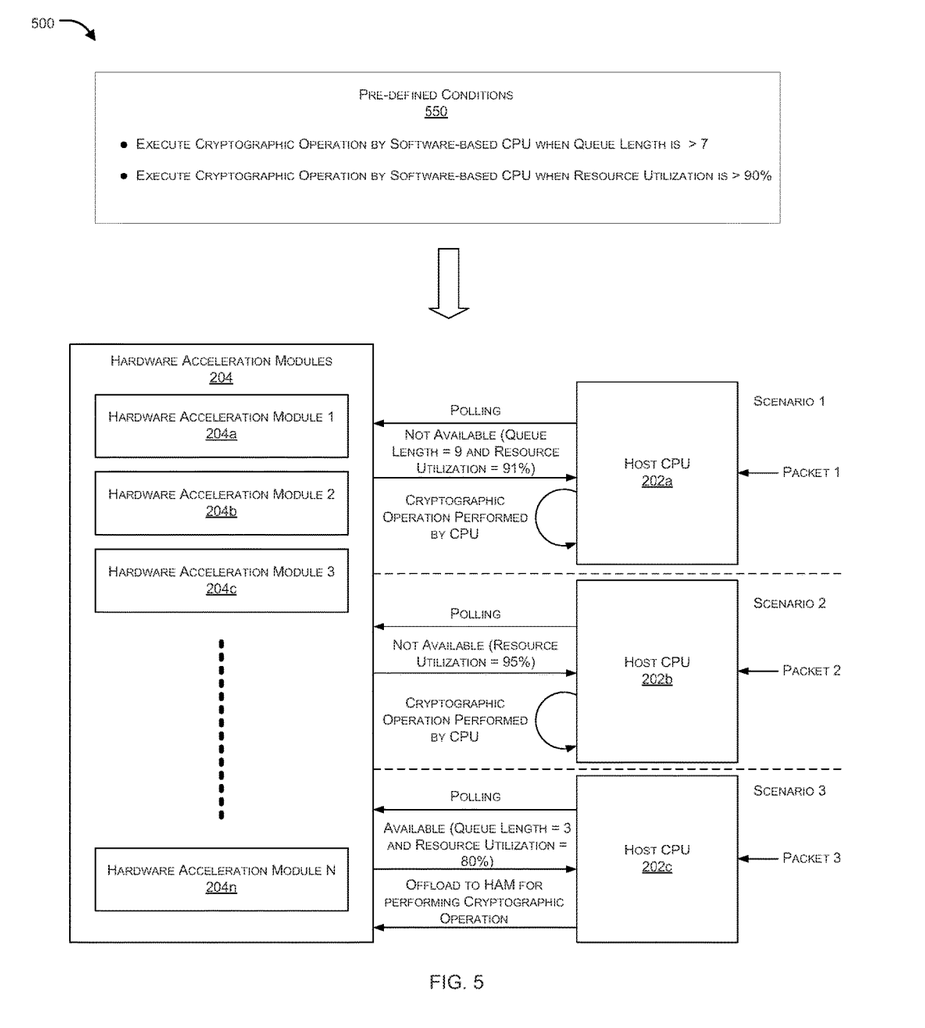
FIG. 5 illustrates various scenarios and interactions between host CPUs and hardware acceleration modules in accordance with an embodiment of the present invention

FIG. 5 illustrates various scenarios and interactions between host CPUs and cryptographic hardware accelerator modules in accordance with an embodiment of the present invention. As shown in FIG. 5, there can be several predefined conditions 550 that can be maintained by the computer system in order to enable dual-mode performance of cryptographic operations. In an exemplary implementation, for example, in scenario 1, a host CPU 202(a), on receiving Packet 1, can poll state information from hardware accelerator modules 204, which can be cryptographic accelerator modules in an embodiment. When CPU 202(a) receives state information indicating that HAM 204 is not available (e.g., the queue length=9 and resource utilization=91%), the cryptographic operation on packet 1 or a portion (e.g., data block) thereof can be performed by host CPU 202a as directed by predefined conditions 550.

In scenario 2, when Packet 2 is received, CPU 202b can again poll the state information from HAM 204, which can indicate resource utilization of 95%, based on which the system can conclude that HAM 204 is not available for performing the cryptographic operation, and hence the operation can be performed by host CPU 202b.

In scenario 3, when CPU 202c receives packet 3, it polls the state information and receives an indication that the queue length is 3 and resource utilization is 80%, based on which CPU 202c, in view of predefined conditions 550, can conclude that HAM 204 is available, and can offload performance of the cryptographic operation on a data block to HAM 204.

In exemplary implementation, load balancing among various HAM 204s can be performed by a dedicated controller or a scheduler based on one or more predefined scheduling criteria or based on a dynamically adaptive scheduling technique.

Figure 6:
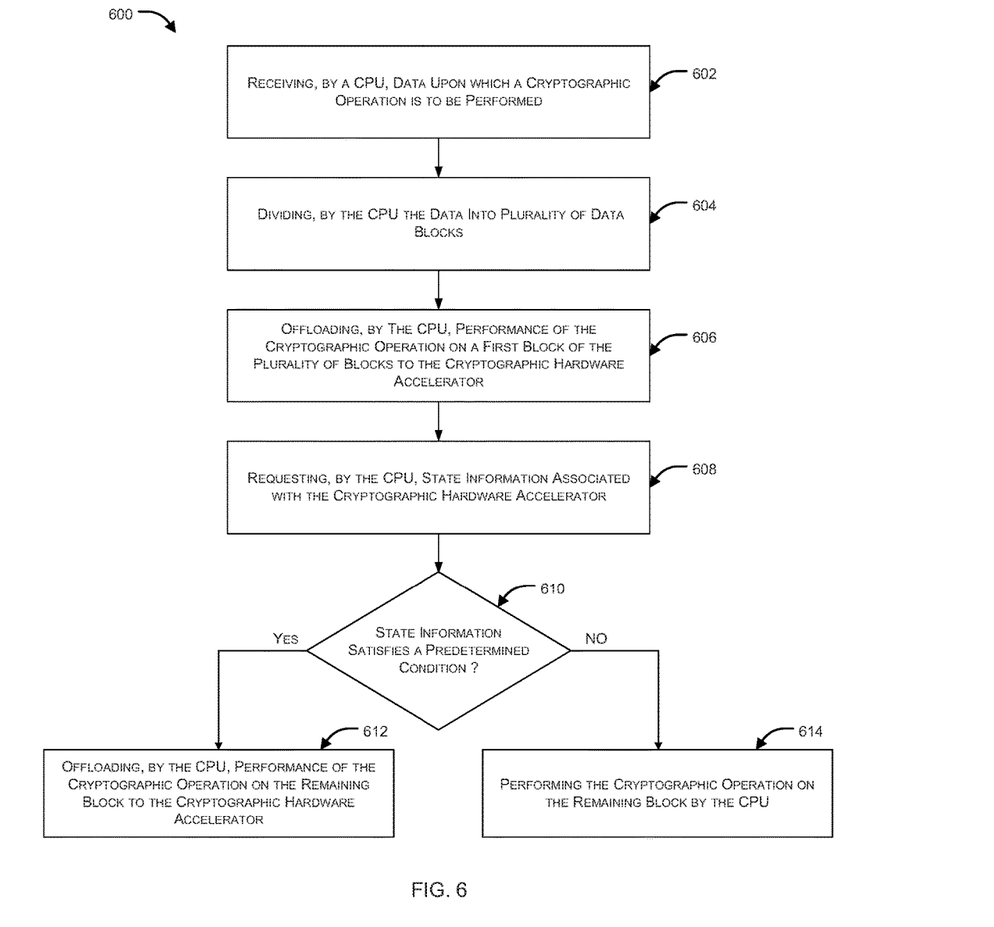
FIG. 6 is a flow diagram illustrating processing of encrypted packet data in accordance with an embodiment of the present invention.

FIG. 6 is a flow diagram 600 illustrating processing of encrypted packet data in accordance with an embodiment of the present invention. In an aspect, a method for performance of a dual mode cryptographic operation can include the steps of receiving, by a computer system having a host central processing unit (CPU) and a cryptographic hardware accelerator coupled to the host CPU, data upon which a cryptographic operation is to be performed as shown at step 602; dividing the data into multiple data blocks as shown at step 604; offloading, by the CPU, performance of the cryptographic operation on a first block of the multiple blocks to the cryptographic hardware accelerator as shown at step 606; requesting, by the CPU, state information associated with the cryptographic hardware accelerator as shown at step 608; checking if the state information satisfies a predetermined condition as shown at step 610; and offloading, by the CPU, selective performance of the cryptographic operation on the remaining blocks by the CPU or the cryptographic hardware accelerator based on the current state information. For example, when the state information satisfies one or more predefined conditions as shown at step 612, the cryptographic operation can be offloaded to the cryptographic hardware accelerator. Alternatively, when the state information does not satisfy the one or more predefined conditions, the cryptographic operation can be performed on the next data block of the remaining data blocks by invoking a native hardware supported cryptographic instruction on the remaining block by the CPU as shown at step 614.

In an exemplary implementation, in order to more efficiently utilize resources of the CPU and the cryptographic hardware accelerator, the cryptographic operation can be performed on at least one of the multiple blocks by the cryptographic hardware accelerator and the cryptographic operation can be performed on at least another of the multiple blocks by the CPU, thereby reducing wasted polling cycles by the CPU and making use of the CPU's native hardware supported cryptographic instructions when the cryptographic hardware accelerator is busy.

Figure 7:
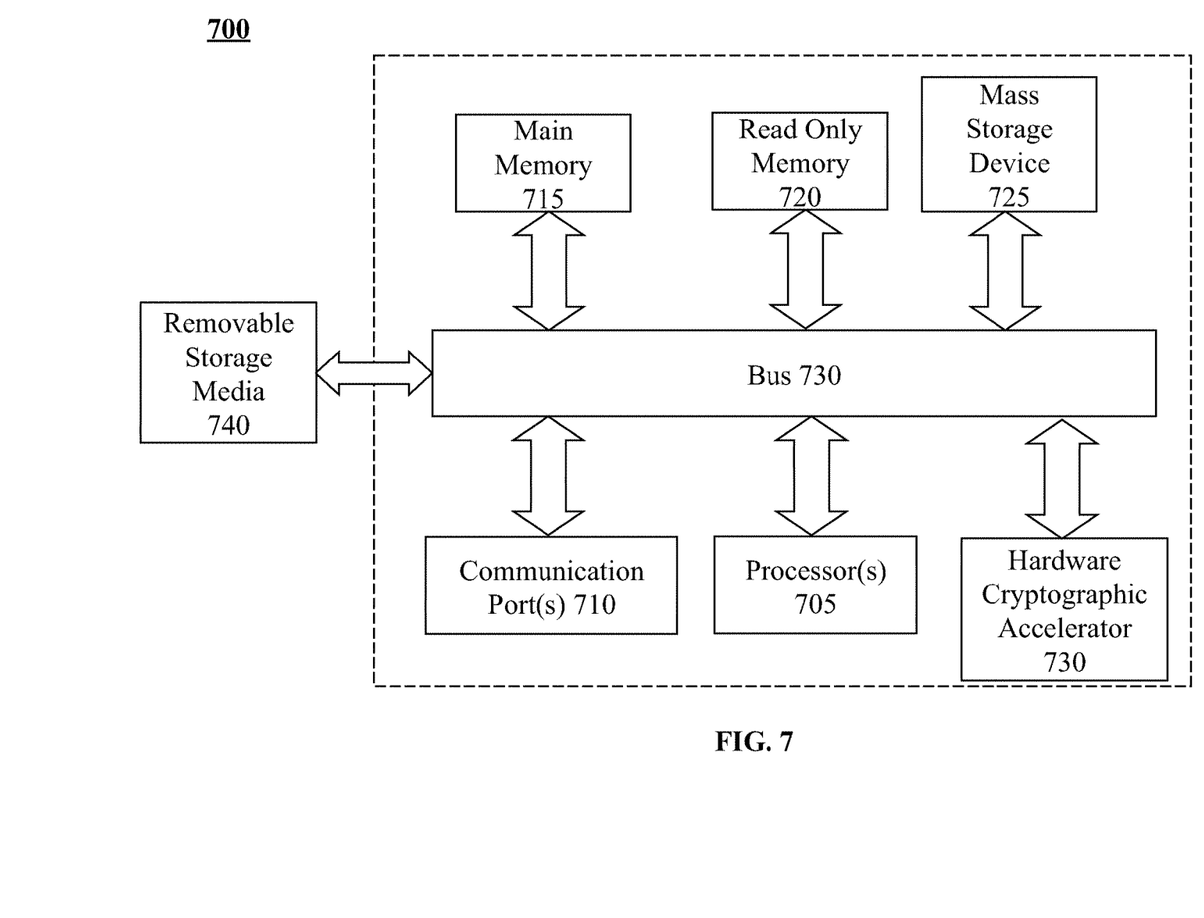
FIG. 7 illustrates an exemplary computer system in which or with which embodiments of the present invention may be utilized.

FIG. 7 illustrates an exemplary computer system. Computer system 700 may perform dual mode processing of cryptographic operations based on state information associated with a cryptographic hardware accelerator module 730. Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As shown, computer system 700 includes a bus 730, a processor 705, communication port 710, a main memory 715, a removable storage media 740, a read only memory 720, a mass storage 725 and cryptographic hardware accelerator module 730. Those skilled in the art will appreciate that computer system 700 may include more than one processor, cryptographic hardware acceleration module and communication ports. Examples of processor 705 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 705 may include various modules associated with embodiments of the present invention.

Communication port 710 can be any of an RS-232 port for use with a modem based dialup connection, a 10/100 Ethernet port, a Gigabit or 10 Gigabit port using copper or fiber, a serial port, a parallel port, or other existing or future ports. Communication port 710 may be chosen depending on a network, such a Local Area Network (LAN), Wide Area Network (WAN), or any network to which computer system 700 connects. Memory 715 can be Random Access Memory (RAM), or any other dynamic storage device commonly known in the art.

Read only memory 720 can be any static storage device(s) e.g., but not limited to, a Programmable Read Only Memory (PROM) chips for storing static information e.g. start-up or BIOS instructions for processor 705. Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to software system. Optionally, operator and administrative interfaces, e.g. a display, keyboard, and a cursor control device, may also be coupled to bus 730 to support direct operator interaction with computer system 700. Other operator and administrative interfaces can be provided through network connections connected through communication port 710.

Examples of cryptographic hardware accelerator 730, include, but are not limited to, custom and off-the-shelf solutions, such as one implemented by a custom application specific integrated circuit (ASIC), one integrated into a system on a chip as a separate processor, as a special purpose CPU (or core), one integrated in a co-processor on the circuit board or one contained on a chipset on an extension circuit board connected to the mainboard via bus 730, that are designed specifically to perform computationally intensive cryptographic operations.

Removable storage media 740 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. A method for performing an efficient execution of a cryptographic operation comprising:

receiving, data upon which the cryptographic operation is to be performed by a computer system being configured with dual-mode cryptographic processing capabilities, wherein the computer system includes a host central processing unit (CPU) and a cryptographic hardware accelerator coupled to the host CPU;

dividing, by the CPU, the received data into a plurality of blocks with a block size according to the block size of a respective cryptographic algorithm being employed, wherein the cryptographic operation, in accordance with the configured dial-mode cryptographic processing capabilities, is performed on at least one of the plurality of blocks by the cryptographic hardware accelerator and is performed on at least another of the plurality of blocks by the CPU in a following sequence as directed by a scheduler running on the CPU:

offloading, by the CPU, performance of the cryptographic operation on a first block of the plurality of blocks to the cryptographic hardware accelerator; and subsequently, for each remaining subsequent block of the plurality of blocks;

requesting, by the CPU, state information associated with the availability of the cryptographic hardware accelerator including at least a resource utilization;

when the state information satisfies a predetermined condition of the availability, then offloading, by the CPU, performance of the cryptographic operation on the remaining subsequent block to the cryptographic hardware accelerator;

when the state information does not satisfy the predetermined condition of the availability, then performing, by the CPU, the cryptographic operation on the remaining subsequent block by invoking a native hardware supported cryptographic instruction on the remaining subsequent block rather than waiting for the availability of the cryptographic hardware accelerator to facilitate the efficient execution of the cryptographic operation.

2. The method of claim 1, wherein the state information is indicative of whether the cryptographic hardware accelerator is available to perform the cryptographic operation and wherein the predetermined condition comprises availability of the cryptographic hardware accelerator to perform the cryptographic operation.

3. The method of claim 1, wherein the predefined condition is based on any or a combination of an extent to which a queue of the cryptographic hardware accelerator is occupied, an expected amount of time for the cryptographic operation to be completed by the cryptographic hardware accelerator, and a current utilization of one or more resources of the cryptographic hardware accelerator.

4. The method of claim 1, wherein the plurality of blocks each comprise 128 bits and wherein the cryptographic operation comprises an Advanced Encryption Standard (AES) encryption operation.

5. The method of claim 1, wherein said requesting, by the CPU, state information associated with the cryptographic hardware accelerator comprises polling, by the scheduler the cryptographic hardware accelerator.

6. A computer system for performing an efficient execution of a cryptographic operation comprising:
  a cryptographic hardware accelerator;
  a host central processing unit (CPU), coupled to the cryptographic hardware accelerator, having a plurality of native hardware supported cryptographic operations;
  wherein responsive to receiving by the host CPU data upon which the cryptographic operation is to be performed by the computer system being configured with dual-mode cryptographic processing capabilities, the CPU performs a method comprising:
    dividing, the received data by the CPU into a plurality of blocks with a block size according to the block size of a respective cryptographic algorithm being employed, wherein the cryptographic operation, in accordance with the configured dial-mode processing capabilities, is performed on at least one of the plurality of blocks by the CPU in a following sequence as directed by a scheduler running on the CPU;
    offloading performance of the cryptographic operation on a first block of the plurality of blocks to the cryptographic hardware accelerator; and subsequently,
    for each remaining subsequent block of the plurality of blocks;
    requesting by the CPU state information associated with availability of the cryptographic hardware accelerator including at least a resource utilization;
    when the state information satisfies a predetermined condition of the availability, then offloading performance of the cryptographic operation on the remaining subsequent block to the cryptographic hardware accelerator;
    when the state information does not satisfy the predetermined condition of the availability, then performing by the CPU the cryptographic operation on the remaining subsequent block by invoking a native hardware supported cryptographic instruction of the plurality of native hardware supported cryptographic operations on the remaining subsequent block rather than waiting for the availability of the cryptographic hardware accelerator to facilitate the efficient execution of the cryptographic operation.

7. The computer system of claim 6, wherein the state information is indicative of whether the cryptographic hardware accelerator is available to perform the cryptographic operation and wherein the predetermined condition comprises availability of the cryptographic hardware accelerator to perform the cryptographic operation.

8. The computer system of claim 6, wherein the predefined condition is based on any or a combination of an extent to which a queue of the cryptographic hardware accelerator is occupied, an expected amount of time for the cryptographic operation to be completed by the cryptographic hardware accelerator, and a current utilization of one or more resources of the cryptographic hardware accelerator.

9. The computer system of claim 6, wherein the plurality of blocks each comprise 128 bits and wherein the cryptographic operation comprises an Advanced Encryption Standard (AES) encryption operation.

10. The computer system of claim 6, wherein said requesting state information associated with the cryptographic hardware accelerator comprises polling, by the scheduler, the cryptographic hardware accelerator.

\* \* \* \* \*

UNITED STATES PATENT AND TRADEMARK OFFICE
CERTIFICATE OF CORRECTION

PATENT NO. : 10,033,527 B2
APPLICATION NO. : 15/199078
DATED : July 24, 2018
INVENTOR(S) : Wei Wang Page 1 of 1

It is certified that error appears in the above-identified patent and that said Letters Patent is hereby corrected as shown below:

In the Claims

Claim 1:
Column 12, Line 53, delete "dial" and insert --dual--

Claim 6:
Column 14, Line 1, delete "dial" and insert --dual--

Claim 6:
Column 14, Line 2, insert --of the plurality of blocks by the cryptographic hardware accelerator and is performed on at least another-- after the word "one" and before the word "of"

Signed and Sealed this
Eleventh Day of September, 2018

Andrei Iancu
*Director of the United States Patent and Trademark Office*